United States Patent [19]

Rasshofer et al.

[11] Patent Number: 4,677,136
[45] Date of Patent: Jun. 30, 1987

[54] PROCESS FOR THE PRODUCTION OF POLYISOCYANATE COMPOSITIONS CONTAINING UREA AND/OR BIURET GROUPS, THE POLYISOCYANATE COMPOSITIONS OBTAINED BY THIS PROCESS, AND THEIR USE FOR THE PRODUCTION OF PLASTICS BY THE ISOCYANATE POLYADDITION PROCESS

[75] Inventors: Werner Rasshofer, Cologne; Reiner Paul, Muelheim-Ruhr, both of Fed. Rep. of Germany

[73] Assignee: Bayer Aktiengesellschaft, Leverkusen, Fed. Rep. of Germany

[21] Appl. No.: 884,831

[22] Filed: Jul. 11, 1986

[30] Foreign Application Priority Data

Jul. 23, 1985 [DE] Fed. Rep. of Germany ....... 3526233

[51] Int. Cl.$^4$ .............................................. C08G 18/14
[52] U.S. Cl. ...................................... 521/159; 528/73; 528/76; 528/77; 528/78; 528/83; 264/51; 264/328.1; 264/328.6; 264/328.8
[58] Field of Search ..................... 521/159; 528/73, 76, 528/77, 78, 83; 264/51, 328.1, 328.6, 328.8

[56] References Cited

U.S. PATENT DOCUMENTS

| 3,441,588 | 4/1969 | Wagner et al. | 260/453 |
|---|---|---|---|
| 3,644,457 | 2/1972 | Konig et al. | 260/453 |
| 3,883,571 | 5/1975 | Allport et al. | 260/453 |
| 4,031,026 | 6/1977 | Ibbotson | 252/182 |
| 4,055,548 | 10/1977 | Carleton et al. | 260/77.5 |
| 4,115,429 | 9/1978 | Reiff et al. | 260/453 |
| 4,118,411 | 10/1978 | Reiff et al. | 260/453 |
| 4,125,545 | 11/1978 | Kroplinski et al. | 260/404.5 |
| 4,229,347 | 10/1980 | Holt et al. | 260/239 |
| 4,234,714 | 11/1980 | Earing et al. | 528/67 |
| 4,261,852 | 4/1981 | Carroll et al. | 528/59 |
| 4,321,333 | 3/1982 | Alberino et al. | 521/159 |

FOREIGN PATENT DOCUMENTS

| 1129599 | 8/1982 | Canada . |
|---|---|---|
| 1178603 | 11/1984 | Canada . |
| 1369334 | 10/1974 | United Kingdom . |
| 1430445 | 3/1976 | United Kingdom . |
| 1444192 | 7/1976 | United Kingdom . |
| 1450660 | 9/1976 | United Kingdom . |
| 1577767 | 10/1980 | United Kingdom . |

OTHER PUBLICATIONS

"Polyurethanes, Chemistry and Technology", Part I., J. H. Saunders and K. C. Frisch, Interscience Publishers, N.Y. 1962, pp. 190-194.

Primary Examiner—Maurice J. Welsh
Attorney, Agent, or Firm—Gene Harsh; Joseph C. Gil; Thomas W. Roy

[57] ABSTRACT

The present invention is directed to a process for the production of polyisocyanates containing urea and/or biuret groups by reacting organic polyisocyanates with a mixture of water, high molecular weight isocyanate reactive compounds and optionally low molecular weight isocyanate reactive compounds. The present invention is further directed to the products obtained by this process and their use for the production of polyisocyanate polyaddition productions, especially for the preparation of molded articles by the RIM process.

11 Claims, No Drawings

PROCESS FOR THE PRODUCTION OF POLYISOCYANATE COMPOSITIONS CONTAINING UREA AND/OR BIURET GROUPS, THE POLYISOCYANATE COMPOSITIONS OBTAINED BY THIS PROCESS, AND THEIR USE FOR THE PRODUCTION OF PLASTICS BY THE ISOCYANATE POLYADDITION PROCESS

BACKGROUND OF THE INVENTION

1. Field of the Invention

This invention relates to a new process for the production of new polyisocyanate compositions containing urea and/or biuret groups, the polyisocyanate compositions obtained by this process, and their use for the production of plastics materials by the isocyanate polyaddition process, in particular the production of molded plastics materials by the reaction injection molding process.

2. Description of the Prior Art

The production of urethane-modified polyisocyanate compositions, i.e. prepolymers or semi-prepolymers containing isocyanate end groups, in particular those based on polyisocyanates or polyisocyanate mixtures of the diphenylmethane series (4,4'-diisocyanatodiphenylmethane, mixtures thereof with 2,4'- and optionally 2,2'-diisocyanatodiphenylmethane or phosgenation products of aniline/formaldehyde condensates containing higher homologues in addition to these diisocyanates) and various polyhydroxyl compounds is known (see e.g. Nos. EP-A-10 850 or 66,130: Nos. DE-OS 2,347,207, 2,404,166, 2,513,793, 2,513,796, 2,620,222, 2,622,104, 2,732,182, 2,737,338, 2,804,375, 2,810,596, 2,815,579 or 2,913,126; U.S. Pat Nos. 3,644,457, 4,055,548, 4,234,714 or 4,321,333, and GB-PS No. 1,369,334).

The processes disclosed in these prior publications are generally directed to the liquefaction of a diisocyanato diphenyl methane which is solid at room temperature, in particular 4,4'-diisocyanatodiphenylmethane, or the reduction of the tendency of polyisocyanate mixtures of the diphenylmethane series which are liquid at room temperature to undergo crystallization when stored at low temperatures.

If polyisocyanates are to be prepolymerized or semi-prepolymerized with polyols, however, it is necessary to reach certain compromises regarding the structure and molecular weight of these polyols in order to achieve a liquefying effect. Because of this, the polyhydroxyl compounds which provide the best mechanical results in polyurethane plastics prepared from the polyisocyanate compositions in many cases cannot be used for this prepolymerization or semi-prepolymerization. One main disadvantage is that the urethane groups present in the prepolymers or semi-prepolvmers have little thermal resistance compared with urea or amide groups. Consequently, if the plastics prepared from these prepolymers or semi-prepolymers contain mainly urethane groups, they generally have less favorable mechanical properties at elevated temperatures than comparable plastics in which the urethane groups or at least some of the urethane groups are replaced by urea groups.

Polyisocyanates containing urea and/or biuret bonds are also known (see e.g. "Polyurethanes", Chemistry and Technology, Part I, by Saunders and Frisch, Interscience Publishers (1962), pages 190 et seq). Thus DE-PS No. 1,215,365 teaches the preparation of relatively high molecular weight polyisocyanates having a biuret structure by the reaction of at least 3 mol of an organic diisocyanate with 1 mol of an $\omega,\omega'$-diaminopolyether having an average molecular weight of 200 to 6,000, optionally mixed with a small quantity of a corresponding $\omega,\omega'$-dihydroxy- or $\omega$-hydroxy-$\omega'$-aminopolyether. The preparation of liquid polyisocyanate compositions by heating an organic diisocyanate with a solution of an aromatic diamine in an organic solvent to a temperature of 150°–200° C. for 1–4 hours is described in GB-PS No. 1,078,390.

A process for the preparation of biuret polyisocyanates by the reaction of at least 3 mol of a diisocyanate with 1 mol of water is described in DE-PS No. 1,101,394.

Isocyanate compositions which contain urethane groups in addition to biuret and urea groups may also be obtained by the reaction of mixtures of ketones and dior polyamines with di- or polyisocyanates in accordance with GB-PS No. 1,263,609. Suspensions of isocyanate ureas which are liquid or pasty at room temperature or can be liquefied by heating to 80° C. are described in No. DE-OS 2,902,496. These isocyanate urea suspensions are prepared by mixing aromatic diisocyanates with isocyanate prepolymers and then reacting the mixture with 0.4–0.8 mol of water per mol of the aromatic diisocyanate or with a corresponding quantity of a compound which splits off water. According to No. DE-OS 1,963,190, liquid diprimary aromatic diamines whose reactivity with isocyanates has been reduced by electrophilic or sterically hindered substituents are reacted with polyisocyanates to form stable, liquid polyisocyanates containing biuret groups. According to No. DE-OS 2,010,887, mono- and polyamines containing secondary amino groups are reacted together at 80°–200° C. for the preparation of liquid polyisocyanates containing biuret groups. According to No. DE-OS 2,032,547, these starting components give rise to isocyanates containing urea groups which are liquid at a temperature of $-20°$ to 80° C. No. DE-OS 2,261,065 describes the reaction of organic polyisocyanates with subequivalent quantities of aliphatic or cycloaliphatic diamines to form the corresponding polyisocyanates containing biuret groups. According to No. DE-OS 3,003,543, urea-modified polyisocyanates are obtained by the reaction of simple polyisocyanates with subequivalent quantities of polyamines containing more than 3 non-aromatically bound amino groups. According to No. DE-OS 3,114,638, special diisocyanates and/or diamines containing aromatically bound isocyanate or amino groups are used for the preparation of aromatic polyisocyanates containing urea and/or biuret groups. U.S. Pat. No. 3,906,019 describes the preparation of di-(isocyanatotolyl)-urea by the reaction of tolylene diisocyanate with water in excess tolulene diisocyanate. Products which have melting points in the region of 170°–180° C. and are extremely insoluble in tolylene diisocyanate are obtained.

The products of the processes disclosed in these prior publications have, however, not achieved any position of significance for the production of position of significance for the production of semi-rigid, foamed or unfoamed, molded elastomeric plastics of the type obtainable by the reaction injection molding technique.

It is an object of the present invention to provide a process for the production of polyisocyanate compositions containing urea and/or biuret groups which would combine the following advantages:

1. It should be possible to use water as reactant for the starting polyisocyanates in addition to other compounds containing isocyanate reactive groups.
2. Production of the polyisocyanate compositions should lead to a reduction in the tendency of the starting polyisocyanates to crystallize at room temperature, in particular when using the preferred starting polyisocyanates, i.e. polyisocyanate mixtures of the diphenylmethane series predominantly containing 4,4'-diisocyanatodiphenyl methane, or, if 4,4'-diisocyanatodiphenyl methane is used, it should lead to liquefaction of this starting diisocyanate.
3. The process should be able to be carried out in a simple manner at relatively low temperatures and have a wide range of possible variations, i.e. it should be possible to obtain liquid, storage stable polyisocyanate compositions not only by using water as a reactant, but also by reacting the organic polyisocyanates with low molecular weight, aliphatic and, in particular, also aromatic di- and/or polyamines which have previously only resulted in difficulty soluble ureas or polyureas when reacted with organic polyisocyanates.

This problem was able to be solved by the process described in more detail below, in which mixtures of water, certain relatively high molecular weight compounds containing isocyanate reactive groups, in particular amino groups, and, optionally, also certain low molecular weight compounds containing isocyanate reactive groups, in particular amino groups, are reacted with excess quantities of organic polyisocyanates to produce storage stable polyisocyanate compositions containing urea and/or biuret groups. The possibility of carrying out the process according to the invention is surprising in that it is known that water reacts with organic polyisocyanates to form difficulty soluble ureas and polyureas.

SUMMARY OF THE INVENTION

The present invention relates to a process for the production of polyisocyanate compositions containing urea and/or biuret groups and having an isocyanate content of about 0.7–45% by weight, characterized in that (A) organic polyisocyanates having an isocyanate content of about 10–50% by weight or mixtures of organic polyisocyanates having an isocyanate content of about 10–50% by weight are reacted with (B) organic compounds containing isocyanate reactive groups and (C) water, using an equivalent ratio of isocyanate groups of component A to isocyanate reactive groups of components B and C of about 2:1 to 100:1 and an equivalent ratio of isocyanate reactive groups of components B and C within the range of about 1:0.1 to 1:10, component B being based on (B1) polyethers or polyesters having a molecular weight of 500 to about 20,000 which are at least difunctional in isocyanate addition reactions and contain alcoholic hydroxyl groups attached to primary and/or secondary carbon atoms and/or aromatically and/or (cyclo)aliphatically bound primary and/or secondary amino groups, or mixtures of such compounds, optionally in admixture with (B2) organic compounds having a molecular weight of 60 to 499 and at least two isocyanate reactive groups.

The process is further characterized in that it is carried out using an equivalent ratio, based on the isocyanate reactive groups, of B1+C:B2 of about 1:0 to 1:10, and an equivalent ratio of B1:B2 of about 1:0 to 1:5 and in that the optionally:used component B2 is selected from (a) aromatic di- or triamines having a molecular weight of 108 to 499 containing primary and/or secondary amino groups, (b) (cyclo)aliphatic di- and/or triamines having a molecular weight of 60 to 499 containing primary and/or secondary amino groups, (c) organic compounds having a molecular weight of 61 to 499 which are at least difunctional in isocyanate addition reactions and contain both (i) at least one aromatically and/or (cyclo)-aliphatically bound primary and/or secondary amino group and (ii) at least one alcoholic hydroxyl group attached to a primary or secondary carbon atom, (d) alcohols having a molecular weight of 60–499 which are at least dihydric and optionally contain ether or ester groups, (e) hydrazine and derivatives thereof containing at least two reactive NH groups, and (f) mixtures of the compounds mentioned under (a) to (e).

The invention further relates to the polyisocyanate compositions containing urea and biuret groups obtainable by this process.

Lastly, the invention relates to the use of the polyisocyanate preparations obtainable by this process as isocyanate components for the production of plastics by the isocyanate polyaddition process.

DETAILED DESCRIPTION OF THE INVENTION

The polyisocyanates (component A) used in the process according to the invention may be any organic polyisocyanates having an isocyanate content of about 10–50% by weight or any mixtures of such organic polyisocyanates having an isocyanate content of about 10–50% by weight.

The polyisocyanates used in the process according to the invention preferably have aromatically bound isocyanate groups. These polyisocyanates include 2,4-diisocyanatotoluene, 2,6-diisocyanatotoluene, 1,2-bis-(4-isocyanatophenyl)-ethane, alkyl-substituted, in particular methyl-substituted diisocyanatodiphenylmethanes, for example of the type described in EP A Nos. 24,665 or 46,556, and in particular polyisocyanates and polyisocyanate mixtures of the diphenyl methane series. Any mixtures of such polyisocyanates may also be used in the process according to the invention. The preferred polyisocyanates and polyisocyanate mixtures include those of the dipehenyl methane series such as 4,4'-diisocyanatodiphenylmethane; mixtures thereof with 2,4'- and optionally 2,2'-diisocyanatodiphenylmethane containing up to about 70% by weight, preferably up to about 20% by weight, based on the total mixture, of 2,4'-diisocyanatodiphenylmethane, but generally not containing more than about 5% by weight of 2,2'-diisocyanatodiphenyl methane; polyisocyanate mixtures of the kind obtained by the phosgenation of aniline/formaldehyde condensates and optionally containing varying quantities of higher polyisocyanate homologues (generally about 5 to 60% by weight, based on the total mixture) in addition to the aforesaid diisocyanatodiphenylmethane isomers; urethane-containing reaction products obtained by reaction of these di- and/or polyisocyanates with subequivalent quantities of aliphatic polyhydroxyl compounds having a molecular weight of 62 to about 700, such as ethylene glycol, trimethylol propane, propylene glycol, dipropylene glycol or polypropylene glycols; and di- and/or polyisocyanates modified by partial carbodiimidization of the isocyanate groups of the above di- and/or polyisocyanates.

The particularly preferred starting materials A include derivatives of 4,4'-diisocyanatodiphenylmethane, which are liquid at room temperature, such as the polyisocyanates containing urethane groups obtainable according to DE-PS No. 1,618,380 (U.S. Pat. No. 3,644,457) by the reaction of 1 mol of 4,4'-diisocyanatodiphenylmethane with about 0.05 to 0.3 mol of low molecular weight diols or triols, preferably polypropylene glycols having a molecular weight below 700, or diisocyanates based on 4,4'-diisocyanatodiphenylmethane and containing carbodiimide and/or uretone imine groups such as those obtainable according to U.S. Pat. Nos. 3,152,162, 3,384,653, 3,449,256, No. DE-OS 2,537,685 or No. EP-OS 5,233 (U.S. application Ser. No. 903,308). The particularly preferred polyisocyanates also include the corresponding modification products based on mixtures of 2,4'- and 4,4'-diisocyanatodiphenyl methane or on mixtures of 4,4'-diisocyanatodiphenylmethanes which have been modified as described above with minor quantities of higher than difunctional polyisocyanates of the diphenylmethane series, for example of the type described in No. DE-OS 2,624,526. The preferred polyisocyanates to be used according to the invention are generally polyisocyanates and polyisocyanate mixtures of the diphenylmethane series which are liquid at room temperature, have optionally been chemically modified as described above, have an (average) isocyanate functionality of about 2 to 2.2, in particular 2, and in which 4,4'-diisocyanatodiphenylmethane is present as the main component (more than about 50% by weight).

The polyisocyanates used in the process according to the invention may be polyisocyanates or polyisocyanate mixtures of the diphenylmethane series optionally together with up to about 50 isocyanate equivalents %, based on the total mixture, of other aromatic polyisocyanates, but the above mentioned polyisocyanates and polyisocyanate mixtures of the diphenylmethane series are most preferably used as the only polyisocyanates in the process according to the invention.

The compounds B1 containing isocyanate reactive groups are polyethers or polyesters having a molecular weight of 500 to about 20,000, preferably about 1,000 to 7,000 and containing at least 2 isocyanate reactive groups, preferably as end groups. These isocyanate reactive groups may be alcoholic hydroxyl groups attached to primary or secondary carbon atoms and/or aromatically or (cyclo)aliphatically bound primary or secondary, preferably primary amino groups. The above stated molecular weights may be determined, for example, by vapor pressure osmometry.

Component B1 may thus contain aminopolyethers, aminopolyesters, polyether polyols, polyester polyols or mixtures thereof commonly used in polyurethane chemistry and conforming to the particulars indicated above. Polyethers or polyesters containing both amino and hydroxyl groups are, of course, also suitable.

Polyether polyols suitable for use as component B1 include the alkoxylation products of suitable starter molecules known from polyurethane chemistry and ethylene oxide and/or propylene oxide, the alkylene oxides being used either as mixtures or successively in the preparation of the alkoxylation products. Examples of suitable starter molecules include water, simple polyhydric alcohols such as 1,2-dihydroxy ethane, 1,2-dihydroxy propane, 1,3-dihydroxy propane, 1,4-dihydroxy butane, 1,6-dihydroxy hexane, trimethylol propane, glycerol, pentaerythritol, cane sugar or mixtures of such starter molecules. If solid starter molecules such as cane sugar are used, they are generally combined with liquefying, lower functional starter molecules of the type exemplified above.

Polyester polyols suitable for use as component B1 include those known from polyurethane chemistry. Examples include the reaction products of polybasic carboxylic acids such as adipic acid, phthalic acid, tetrahydrophthalic acid and/or hexahydrophthalic acid and excess quantities of monohydric or polyhydric alcohols of the last mentioned type.

Polyesters and polyethers suitable for use as component B1 which contain amino groups, optionally together with hydroxyl groups, are also well known in polyurethane chemistry. These amino polyethers and polyesters are generally prepared by chemically modifying the last mentioned polyether polyols or polyester polyols by at least partial replacement of the hydroxyl groups by amino groups. Such methods of preparation of aminopolyethers and polyesters have been described, for example, in DE-AS No. 1,270,046 (reaction of the starting polyols with excess quantities of organic polyisocyanates followed by conversion of the isocyanate end groups by reacting them with secondary or tertiary carbinols and then splitting the resulting urethanes by heat): DE-AS No. 1,694,152 (reaction of the last mentioned isocyanate prepolymers with excess quantities of organic diamines); FR-PS No. 1,415,317 (conversion of the isocyanate groups in the above mentioned isocyanate prepolymers into amino groups by a reaction with formic acid followed by saponification of the N-formyl derivatives): and DE-AS 1,555,907 (reaction of the above mentioned isocyanate prepolymers with sulphamic acid). Also suitable are the products of the processes of DE-AS No. 1,215,373, DE-PS No. 634,741 and U.S. Pat. No. 3,654,370, i.e. reaction products of polyether polyols or polyester polyols with ammonia in the presence of catalysts and optionally hydrogen. Other processes for the preparation of aminopolyethers or polyesters suitable for use as component B1 according to the invention have been described, for example, in German Offenlegungsschriften Nos. 2,948,419, 3,039,600, 3,112,118, 3,131,252, 3,200,021, 3,144,991, 3,144,874, 3,223,395, 3,223,400, 2,546,536, 2,019,432, 2,619,840, 2,648,774, 2,648,825, 3,035,639, U.S. Pat. Nos. 3,044,989, 3,865,791, 4,180,644 and 2,888,439 and German Auslegeschrift No. 1,193,671.

Particularly preferred for use as component B1 in the process according to the invention are the aminopolyesters and especially aminopolyethers prepared according to No. DE-OS 3,131,252 by thermal decomposition of carbamates or according to the above mentioned publications by pressure amination of polyols. These aminopolyesters and especially aminopolyethers which are preferred for the process according to the invention generally contain a statistical average of 2 to 6, preferably 2 to 3 isocyanate reactive groups per molecule, and at least about 50%, preferably at least about 80%, of the isocyanate reactive groups are primary or secondary, preferably primary amino groups which in accordance with the particulars given above may be attached both to aromatic and to (cyclo)aliphatic carbon atoms. The molecular weight of these preferred aminopolyesters and particularly aminopolyethers is generally about 1,000 to 7,000, preferably about 2,000 to 6,000.

Component B2 is based on compounds of the type already mentioned under (a) to (e) or any mixtures of such compounds.

Examples of component a include aromatic di- or triamines having a molecular weight of 108 to 499 containing primary or secondary, preferably primary amino groups. Included are phenylene diamines which may be alkyl substituted or diaminodiphenyl alkanes which may be alkyl substituted and carry on each aromatic ring an amino group, preferably a primary amino group. Examples include 1,2-, 1,3- and 1,4-diaminobenzene; 2,4- and 2,6-diaminotoluene; 2,4-dimethyl-, 2,4-diethyl-, 2,4-diisopropyl- and 2,4-di-t-butyl-1,3-diaminobenzene; 2,4-diaminomesitylene: 1,3,5-triethyl-2,4-diaminobenzene; 1,3,5-triisopropyl-2,4-diaminobenzene; 1-methyl-3,5-diethyl-2,4-diaminobenzene; 1-methyl-3,5-diethyl-2,6-diaminobenzene and commercial mixtures thereof; 4,6-dimethyl-2-ethyl-1,3-diaminobenzene; 3,5,3',5'-tetraethyl-4,4'-diaminodiphenyl methane; 3,5,3',5'-tetraisopropyl-4,4'-diaminodiphenyl methane; 3,5-diethyl-3',5'-diisopropyl-4,4'-diaminodiphenyl methane; 1-t-butyl-3,5-dimethyl-2,6-diaminobenzene; 4,4'-diaminodiphenyl methane; 4,4'-diaminodiphenyl propane-(2,2); 3,5-diisopropyl-5'-ethyl-4,4'-diaminodiphenyl methane; 3,3',5-trimethyl-5'-isopropyl-, 3,3',5-triethyl-5'-isopropyl-, 3,3',5-trimethyl-5'-sec.-butyl- and 3,3',5-triethyl-5'-sec.-butyl-4,4'-diaminodiphenyl methane; 3,3'-diethyl-5,5'-diisopropyl-, 3,3'-dimethyl-5,5'-di-sec.-butyl-, 3,3'-dimethyl-5,5'-di-sec.-butyl-, 3,3'-diethyl-5,5'-di-sec.-butyl-, 3,5-dimethyl-3',5'-diisopropyl-, 3,5'-dimethyl-3',5-di-sec.-butyl-, 3,5'-diethyl-3',5'-di-sec.-butyl-, 3-methyl-3',5,5'-triisopropyl-, 3-ethyl-3',5,5'-triisopropyl-, 3-methyl-3',5,5'-tri-sec.-butyl-, 3-ethyl-3',5,5'-tri-sec.-butyl-, 3,3'-diisopropyl-5,5'-di-sec.-butyl-, 3,5-diisopropyl-3',5'-di-sec.-butyl-, 3-ethyl-5-sec.-butyl-3',5'-diisopropyl-, 3-methyl-5-tertiary-butyl-3',5'-diisopropyl-, 3-ethyl-5-sec.-butyl-3'-methyl-5'-tertiary-butyl- and 3,3',5,5'-tetra-sec.-butyl-4,4'-diaminodiphenyl methane.

The preparation of such asymmetr cally substituted tetraalkyl-diphenyl methane diamines and mixtures of such products with symmetrically substituted tetraalkyl-diphenyl methane diamines has been described, for example, in DE-AS No. 2,920,501.

Trialkyl-substituted diphenyl methane diamines may also be used such as: 3,5,3'-triisopropyl- or 3,5-diisopropyl-3'-ethyl-4,4'-diaminodiphenyl methane. Also disubstituted diamines such as 3,3'-diisopropyl-4,4'-diaminodiphenyl methane and analogous monosubstituted diamines may be used. Product mixtures containing about 45-70% by weight of 3,5-diethyl-3',5'-diisopropyl-4,4'-diamino-diphenyl methane and 27.5 to 15% by weight of 3,5,3',5'-tetraethyl-4,4'-diamino-diphenyl methane and 27.5-15% by weight of 3,5,3',5'-tetraisopropyl-4,4'-diamino-diphenyl methane are particularly suitable.

Further examples of aromatic diamines and triamines suitable for use as component a include tris-(4-aminopheny)-methane, 1,5-diaminonaphthalene, liquid polyamine mixtures of the diphenyl methane series obtainable by aniline/formaldehyde condensation, aromatic polyamines containing hetero atoms (e.g. optionally $C_1$-$C_{12}$-alkyl substituted 3,5-diaminobenzoic acid-$C_1$-$C_{10}$-alkyl esters, 3,3'-dichloro-4,4'-diamino-diphenyl methane and 4,4'-diaminodiphenyl sulphide) and polyamines containing secondary amino groups such as 4,4'-di-(methylamino)-diphenyl methane. Any mixtures of the polyamines exemplified above may in principle be used.

Particularly preferred are those diprimary aromatic diamines which are readily miscible with component (B1) at room temperature, in particular 1,3-diaminobenzenes having a molecular weight within the range indicated above and containing an alkyl substituent in at least one ortho position to the amino groups. Especially preferred are those diamines which have at least one alkyl substituent in the ortho position to the first amino group and carry, in the ortho position to the second amino group, 2 alkyl substituents which are not identical to the first alkyl substituent and contain 1-4, preferably 1-3 carbon atoms. Those which carry an ethyl, n-propyl, isopropyl and/or t-butyl substituent in each case in an ortho position to the amino groups and optionally methyl substituents in other ortho positions to the amino groups are particularly preferred.

Component b includes (cyclo)aliphatic di- and/or triamines having a molecular weight of 60-499 such as 1,2-diaminoethane, 1,2-diaminopropane, 1,3-diaminopropane, 1,4-diaminobutane, 1,5-diaminopentane, 1,6-diaminohexane, 2,2,4-trimethyl-1,6-diaminohexane, 1,7-diaminoheptane, 1,8-diaminooctane, 1,10-diaminodecane, 1,11-diamino-undecane, 1,12-diaminododecane, diamines containing hetero atoms (such as 1,5-diamino-1,3-oxapentane, 1,8-diamino-3,6-dioxaoctane, 1,11-diamino 3,6,9-trioxaundecane, 1,13-diamino-4,9-dioxatridecane, 1,9-diamino-5-oxanonane), 5-amino-2,2,4-trimethyl-1-cyclopentane-methylamine, 5-amino-1-aminomethyl-1,3,3-trimethyl-cyclohexane (isophorone diamine), 1,4-diaminocyclohexane, 1,3-diamino cyclohexane, 1,8-diamino-p-menthane, 3-aminoethyl-1-(3-aminopropyl-1-methyl)-4-methyl cyclohexane, 1-methyl-2,6-diamino-cyclohexane, 1-methyl-2,4-diamino-cyclohexane, 4,4'-diamino-dicyclohexyl methane and 4,4'-diamino-dicyclohexyl methane and the 2,4'- and 2,2'-isomers thereof, 4,4'-diamino-3,3'-dimethyl-dicyclohexyl methane and the 2,4'- and 2,2'-diamino isomers thereof, 4,4'-diamino-dicyclohexyl ethane, 4,4'-diamino-dicyclohexyl ether, bis-(4'-aminocyclohexyl)-propane-(2,2), 4,4'-diamino-dicyclohexane, 4,4'-diamino-3,3'-diethyl-dicyclohexyl methane, 1,1-di-(4'-aminocyclohexyl)-cyclohexane, 1,1-di-(4'-amino-3'-methylcyclohexyl)-cyclohexane, 4,4'-diamino-3,5-diethyl-3',5'-diisopropyl-dicyclohexyl methane, 4,4'-diamino-3,3',5,5'-tetraethyl-dicyclohexyl methane, di- and polyamines containing tertiary amino groups (such as bis-(3-aminopropyl)-methylamine, N,N'-bis-(2-aminoethyl)-piperazine, and N,N'-bis-(3-aminopropyl)-piperazine) and diamines containing secondary amino groups (such as N-methyl-ethylene diamine, N,N'-diethyl-ethylene diamine, N,N'-dibutyl-hexamethylene diamine, piperazine, 2,5-dimethyl-piperazine and N,N'-diamino piperazine). Low molecular weight "aminopolyethers" which are homologues of the relatively high molecular weight aminopolyethers exemplified under B1 and have a molecular weight below 500 are also suitable as component b. Compounds containing 3 or 4 or even a larger number of primary and/or secondary amino groups may also be used such as 1,6,11-triamino-undecane, 1,5-diamino-3-aza-pentane, 1,8-diamino-3,6-diaza-octane, 1,11-diamino-3,6,9-triaza-undecane, 1,14-diamino-3,6,9,12-tetraaza-tetradecane, 1,7-diamino-4-aza-heptane, 1,11-diamino-4,8-diaza-undecane, 1,13-diamino-7-methyl-7-aza-tridecane and 1,3,5-triamino cyclohexane. Diamino perhydroanthracenes (DE-OS No. 2,638,731) and cycloaliphatic triamines according to DE-OS No. 2,614,244 may also be used.

1,6-diaminohexane as well as the cycloaliphatic diamines exemplified above are preferred for component b.

Component c used according to the invention includes amino alcohols having a molecular weight of 61 to 499 and containing at least one alcoholic hydroxyl group and at least one primary or secondary amino group. Examples include 2-aminoethanol, 2-methyl-2-aminoethanol, 2-ethyl-2-aminoethanol, 6-methyl-3-oxa-6-aza heptanol, 6-hydroxyhexyl-amine, bis-$\beta$-hydroxyethylamine, bis-($\beta$-hydroxyethyl)-methylamine, bis-($\beta$-hydroxyethyl)-butylamine, bis-($\beta$-hydroxyethyl)-oleylamine, bis-($\beta$-hydroxypropyl)-amine, bis-($\beta$-hydroxypropyl)methylamine, bis-($\beta$-hydroxypropyl)-hexylamine, N,N,N'-tris-($\beta$-hydroxypropyl)-ethylene diamine, 3-aminomethyl-3,5,5-trimethyl-cyclohexanol, 2-amino-2-hydroxymethyl-1,3-propanediol, 2-amino-2-methyl-1,3-propanediol and 2-amino-2-methyl-propanol, N-($\beta$-hydroxy ethyl)-ethylene diamine, N-($\beta$-hydroxy ethyl)-propylene-1,2-diamine, N-($\beta$-hydroxy ethyl)-propane-1,3-diamine, N-($\beta$-hydroxy ethyl)-hexane-1,6-diamine, N-($\beta$-hydroxy ethyl)-dodecane-1,12-diamine, N-($\beta$-hydroxypropyl)ethylene diamine, N-($\beta$-hydroxy propyl)-propylene-1,2-diamine, N-($\beta$-hydroxy propyl)-propylene-1,3-diamine, N-($\beta$-hydroxy butyl)-ethylene diamine, N-($\beta$-hydroxy ethyl)-xylylene-1,3-diamine, N-($\beta$-hydroxy ethyl)-cyclohexane-1,3- or -1,4-diamine, N-($\beta$-hydroxy ethyl)-2,2,4-trimethyl hexylene-1,6-diamine, 1-methyl-2-amino-4-[N-(-2-hydroxyethyl)-amino]-cyclohexane, N-($\beta$-hydroxy ethyl)-isophorone diamine, N,N'-bis-($\beta$-hydroxy ethyl)-ethylene diamine, N,N'-bis-($\beta$-hydroxy propyl)-ethylene diamine, N,N'-bis-($\beta$-hydroxy ethyl)-propylene-1,2-diamine, N,N'-bis-($\beta$-hydroxypropyl)-1-methyl-2,6- or -2,4-diamino-cyclohexane, N,N'-bis-($\beta$-hydroxy propyl)-p-xylylene diamine, N-($\beta$-hydroxy ethyl)-N'-($\beta$-hydroxy propyl)-ethylene diamine, 1,3-diaminopropanol-(2), 1,6-diaminohexanol-(2), 1,5-diaminopentanol-(3), 3,4-diamino-2,2-dimethylbutanol-(1), the diamino cyclohexanols and 1,1-diamino undecanol-(6).

Component d to be used according to the invention include alcohols having a molecular weight of 62 to 499 which are at least dihydric, optionally contain ether or ester groups and contain no isocyanate reactive groups apart from the alcoholic hydroxyl groups. Examples include 1,2-dihydroxy ethane, 1,2-dihydroxy propane, 1,4-dihydroxy butane, 1,6-dihydroxy hexane, trimethylol propane and glycerol.

Component e includes hydrazine, methyl hydrazine, ethyl hydrazine, N,N'-dimethyl hydrazine, N,N'-diethyl hydrazine and carboxylic acid hydrazides such as adipic acid-bis-hydrazide.

Component C is preferably free, liquid water although the water may be in the form of compounds containing bound water (e.g. water of crystallization) or in the form of compounds which split off water under the reaction conditions (water in statu nascendi). Compounds of this kind are described, for example, in DE-AS No. 1,101,394.

To carry out the process according to the invention, component B is preferably selected so that not more than about 75 equivalent percent, preferably not more than about 50 equivalent percent of the isocyanate reactive groups of component B are hydroxyl groups, the remainder being aminic or hydrazinic amino groups. Apart from this limitation, any of the compounds mentioned as examples may be combined to form component B which, as already mentioned above, is composed of individual components B1 and optionally B2. The equivalent ratio of the isocyanate reactive groups in component B to water (which is considered to be a difunctional compound) is about 1:0.1 to 1:10, preferably about 1:0.5 to 1:5. Optional component B2 is used, if at all, in such a quantity that the equivalent ratio, based on the isocyanate reactive groups of (B1+C:B2) is in the range of about 1:0 to 1:10, preferably about 1:0.1 to 1:2, and the equivalent ratio of B1:B2 is in the range of about 1:0 to 1:5, preferably about 1:0 to 1:2.

The process according to the invention is preferably carried out by first preparing a reactant by mixing components B1 and C and optionally B2 and then reacting it with polyisocyanate component A, using an equivalent ratio of isocyanate groups to isocyanate reactive groups of about 2:1 to 100:1, preferably about 4:1 to 50:1 and observing a temperature range of about 20° to 140° C., preferably about 20° to 60° C. Isocyanate component A is preferably first introduced into the reaction vessel, the isocyanate reactive component mixture being added continuously or portionwise with stirring. The rate at which it is added is preferably adjusted so that the reaction mixture remains stirrable and does not gel.

The isocyanate reactive component is preferably added to the isocyanate component at about 20° to 30° C., preferably without external cooling or heating. If no external cooling or heating is applied, the temperature rises to about 40° to 60° C. during addition of the isocyanate reactive component. The isocyanate reactive components may be reacted successively with the isocyanate component, but this is less preferred.

After termination of the reaction, the reaction mixture has a viscosity of about 20 to 100,000 mPa.s/25° C., preferably about 100 to 10,000 mPa.s/25° C. depending on the nature of the reactants and the proportions in which they are used. Furthermore, the resulting reaction mixtures may be clear solutions or finely dispersed or coarsely dispersed systems, again depending on the nature and quantitative proportions of the starting components. Whereas clear solutions may be used directly according to the invention, in the case of disperse systems a thermal aftertreatment is often necessary. For such an aftertreatment, the reaction mixture, which may be a fine or coarse dispersion, is stirred for about 5 minutes to 10 hours, preferably about 30 minutes to 6 hours, at about 20°–140° C., preferably about 60°–135° C., most preferably about 80° to 130° C. A procedure by which the temperature is raised continuously or stepwise within the aforesaid ranges during the aftertreatment is particularly suitable. The dispersed particles dissolve in the course of this thermal aftertreatment and at the same time the viscosity of the systems is lowered. It is presumed that a chemical conversion of the urea groups initially present to biuret groups by a reaction with excess isocyanate groups plays an important role in this aftertreatment. The thermal aftertreatment results in either clear or extremely finely dispersed polyisocyanate compositions which can be used for the purpose according to the invention without any difficulty. Clear solutions obtained without thermal aftertreatment as well as clear or finely disperse systems obtained with the aid of the thermal aftertreatment preferably have an isocyanate content of about 18 to 28% by weight and a viscosity at 25° C. of about 20 to 10,000 mPa.s.

The products of the process according to the invention may advantageously be used for the production of plastics based on polyisocyanates, in particular for the production of urea- and/or biuret-modified polyurethane plastics, optionally in admixture with other polyisocyanates known in polyurethane chemistry. It is particularly advantageous to use the products of the process according to the invention as the polyisocyanate component in the production of molded plastics by the "RIM technique," both for the production of rigid, semi-rigid or flexible integral foams and for the production of corresponding solid molded articles, including micro-cellular molded articles having a gross density of about 0.8 to 1.4 g/cm$^3$, preferably about 0.9 to 1.2 g/cm$^3$.

For this purpose according to the invention, the products of the process according to the invention are used instead of or together with the polyisocyanates conventionally used for this purpose. This means in particular that when used for the purpose according to the invention, the components of the reaction and auxiliary substances for the products according to the invention as well as other process parameters conform to the state of the art as disclosed, for example, in German Offenlegungsschriften Nos. 1,953,637, 2,121,670, 2,356,692, 2,363,452, 2,404,310, 2,427,273, 2,431,968, 2,307,589, 2,319,648, 3,012,126 and 3,147,736, U.S. Pat. Nos. 4,065,410 and 4,218,543 and published European Patent Applications (publication numbers) 17,928, 44,481 and 81,701.

The products of the process according to the invention may, of course, also be used to advantage as polyisocyanate components in the production of other polyurethane plastics such as rigid, semi-rigid or flexible polyurethane molded products prepared in open molds, for which purpose they are again used instead of or together with the polyisocyanates previously used for this purpose.

The polyurethane plastics produced with the aid of the products of the process according to the invention are distinguished by their excellent mechanical properties and improved heat resistance characteristics. They may in principle be used for the same fields of application as polyurethane plastics known in the art.

The invention is further illustrated but is not intended to be limited by the following examples in which all parts and percentages are by weight unless otherwise specified.

EXAMPLES

EXAMPLE 1

A mixture of 2761 g of 4,4'-diisocyanatodiphenyl methane (MDI 44) and 5081 g of a uretone imine-modified 4,4'-diisocyanatodiphenyl methane derivative (UI-MDI) having an isocyanate content of 30% was introduced into a reaction vessel at room temperature. A mixture of 2204 g of a polyoxypropylene glycol carrying amino end groups (Jeffamine D 2000 of Texaco/Jefferson) and having a molecular weight of 2000 and 17.4 g of water was added to the mixture at this temperature within 25 minutes with stirring. The mixture became cloudy, the reaction temperature rose to 40° C. and the evolution of gas was observed. The reaction mixture was heated to 125° C. within 75 minutes and clarification of the cloudy reaction mixture was observed from 80° C. onwards. Isocyanate content: 21.1% (theoretical value not taking into account any (partial) biuretization: 22.7%).

EXAMPLE 2

A mixture of 2761 g of 4,4'-diisocyanatodiphenyl methane (MDI 44) and 5081 g of UI-MDI was introduced into a reaction vessel at room temperature. A mixture of 2204 g of Jeffamine D 2000 resin and 34.8 g of water was added at this temperature within 30 minutes with stirring and the evolution of $CO_2$. The reaction mixture was then heated to 135° C. for 90 minutes, cooled and filtered to remove small quantities of undissolved particles. Isocyanate content: 20.0% (theoretical value not taking into account any biuretization: 21.8%).

EXAMPLE 3

A mixture of 277.5 g of 4,4'-diisocyanatodiphenyl methane (MDI 44) and 511 g of UI-MDI was introduced into a reaction vessel at room temperature. A mixture of 218 g of an aminopolyether containing aromatic amino groups and 1.5 g of water was added within 10 minutes at a reaction temperature of 40° to 60° C. The reaction mixture was then heated to 140° C. within 40 minutes, by which time the cloudy reaction mixture has clarified. No undissolved particles were observed. Isocyanate content: 21.8% (theoretical value not taking into account any biuretization: 23.08%).

The aminopolyether used in this example was prepared by hydrolysis of an isocyanate prepolymer having an isocyanate content of 3.6% according to DE-OS No. 3,131,252 as described below:

1 mol of a polyoxypropylene glycol having a molecular weight of 2000 was reacted with 2 mol of 2,4-diisocyanatotoluene at 80° C. for 3 hours. The resulting isocyanate prepolymer was then hydrolyzed at 80° C. with an aqueous potassium hydroxide solution to form the corresponding aminopolyether containing aromatically bound amino groups. The aminopolyether had an NH number of 47.2 mg KOH/g.

EXAMPLE 4

A mixture of 260 g of MDI 44 and 479 g of UI-MDI was introduced into a reaction vessel at 35° C. A mixture of an aminopolyether and 1.4 g of water was added within 10 minutes at a reaction temperature of 40° to 60° C. with stirring, whereupon the reaction mixture became cloudy. A clear solution was obtained when the reaction mixture was heated to a reaction temperature of 130° C. within 40 minutes. Isocyanate content: 22.0% (theoretical value not taking into account any biuretization: 23.0%).

The aminopolyether used in this example was prepared according to DE-OS No. 3,131,252 by hydrolysis of a thin layered isocyanate prepolymer having an isocyanate content of 3.4% using the procedure of Example 3. The polyether (which was reacted with an excess of 2,4-diisocyanatotoluene) was prepared from a 1:1 mixture of a PO/EO mixed po yether polyol started on propylene glycol and trimethylol propane, said mixture having an average functionality of 2.5 and an average OH number of 56.

EXAMPLE 5

A mixture of 250 g of MDI 44 and 460 g of UI-MDI was introduced into a reaction vessel. A mixture of 190 g of a polyoxypropylene glycol having a molecular weight of 2000 and 1.5 g of water, which mixture was at a temperature of 20° C., was added within 12 minutes at room temperature, whereupon the reaction mixture became cloudy. Heating to 140° C. for 2 hours resulted in a clear solution free from particles. This solution again became cloudy when left to stand at room temperature (RT). Isocyanate content: 21.6% (theoretical value not taking into account any biuretization: 23,0%).

EXAMPLE 6

A mixture of 250 g of MDI 44 and 460 g of UI-MDI was introduced into a reaction vessel. A mixture of 190 g of a polyoxypropylene glycol having a molecular weight of 2000, 10 g of a mixture of 65 parts of 1-methyl-3,5-diethyl-2,4-diaminobenzene and 35 parts of 1-methyl-3,5-diethyl-2,6-diaminobenzene and 1.5 g of water, which mixture was at room temperature, was added to the first mentioned mixture at room temperature, whereupon the mixture became cloudy. Heating to 140° C. for 4 hours resulted in a clear solution which was free from particles and remained clear when left to stand at room temperature. The resulting polyisocyanate preparation according to the invention had an isocyanate content of 20.5%.

EXAMPLES OF PRACTICAL APPLICATION

A 1-piston high pressure metering installation with MQ mixing head (Maschinenfabriken Hennecke, St. Augustin) and forced control was used for producing molded parts. The operating pressure was 200 bar.

The polyol and isocyanate components mentioned in the examples below were vigorously mixed together using the above mentioned apparatus at an isocyanate index of 105 (NCO/H active equivalent ratio x 100) and molded into plastics articles having the mechanical properties mentioned in the examples. The temperature of the raw materials used was 35°-40° C., while the molding temperature was 60° C. A polished steel mold having internal dimensions of 200×300×4 mm was used. The internal walls of this mold were coated with a wax-based external mold release agent (Acmos Fluoricon 36/34 of Acmos). The time required for filling the mold was about 1.25 seconds and the dwell time in the mold was about 60 seconds.

EXAMPLE 7

The following mixture was used as the polyol component:

77 parts of a polyether triol with OH number 28 obtained by the propoxylation of trimethylol propane followed by ethoxylation of the propoxylation product (PO:EO ratio by weight =78:22), and 23 parts of a mixture of 65 parts of 1-methyl-3,5-diethyl-2,4-diaminobenzene and 35 parts of 1-methyl-3,5-diethyl-2,6-diaminobenzene, 0.3 parts of triethylene diamine and 0.10 parts of a commercial tin catalyst (catalyst UL 28 of Witco Co.).

ISOCYANATE COMPONENTS

EXAMPLE 7A (COMPARISON)

Commercial polyisocyanate, isocyanate, content 23% prepared by the reaction of MDI 44 with tripropylene glycol.

EXAMPLE 7B (ACCORDING TO THE INVENTION)

Polyisocyanate preparation from Example 3.

EXAMPLE 7C (ACCORDING TO THE INVENTION)

Polyisocyanate preparation from Example 4.

| Mechanical data | Example 7a | Example 7b | Example 7c | |
|---|---|---|---|---|
| Unit weight (DIN 53420) | 1095 | 1072 | 1081 | kg/m$^3$ |
| Tensile strength (DIN 53504) | 28.3 | 27.8 | 26.6 | MPa |
| Tear propagation resistance (DIN 53515) (RT) | 53.4 | 49 | 82 | kN/m |
| Shore D hardness (DIN 53505) | 57 | 57 | 57 | |
| Sag test[a] | 16 | 4.2 | 2.9 | mm |
| bending - E Modulus (ASTM D-790) | | | | |
| at RT | 320 | 293 | 248 | MPa |
| at 120° C. | 95 | 187 | 171 | MPa |
| Factor bending modulus RT/120° C. | 3.4 | 1.6 | 1.5 | |
| HDT value according to the ISO R 75/B test (0.45 MPa) | 95 | 127 | 135 | °C. |

[a]General Motors test method, 100 mm overhang, ½ hour 160° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate containing urea and/or biuret groups and having an isocyanate content of about 0.7 to 45% by weight which is prepared by reacting
   (A) at least one organic polyisocyanate having an NCO content of about 10 to 50% by weight with
   (B) at least one organic compound containing isocyanate reactive groups comprising
      (i) a polyether or polyester having a molecular weight of 500 to about 20,000 and containing at least two isocyanate reactive groups comprising a member selected from the group consisting of alcoholic hydroxyl groups attached to primary carbon atoms, alcoholic hydroxyl groups attached to secondary carbon atoms, aromatically bound primary amino groups, aromatically bound secondary amino groups, cycloaliphatically bound primary amino groups, cycloaliphatically bound secondary amino groups, aliphatically bound primary amino groups, aliphatically bound secondary amino groups and mixtures thereof and, optionally,
      (ii) a low molecular weight organic compound comprising
         (a) an aromatic diamine or triamine having a molecular weight of 108 to 499 and containing primary and/or secondary amino groups,
         (b) an aliphatic or cycloaliphatic diamine or triamine having a molecular weight of 60 to 499 and containing primary and/or secondary amino groups,
         (c) an organic compound having a molecular weight of 61 to 499 and containing at least one alcoholic hydroxyl group attached to a primary or secondary carbon atom and at least one aliphatically, cycloaliphatically or aromatically bound primary or secondary amino group, (d) a compound containing at least two alcoholic hydroxyl groups and optionally at least one ether or ester group, (e) hydrazine or a derivative of hydrazine containing at least two reactive NH groups and (f) mixtures of (a)–(e), and (C) water wherein the equivalent ratio of isocyanate groups in component A to isocyanate reactive groups in components B and C is about 2:1 to 100:1; the equivalent ratio of isocyanate reactive groups in components B and C is about 1:0.1 to 1:10; the equivalent ratio of isocyanate reactive groups in components B1 and C to component B2 is about 1:0 to 1:10; and the equivalent ratio of isocyanate reactive groups in component B1 to component B2 is about 1:0 to 1:5.

2. The polyisocyanate of claim 1 wherein not more than about 75% of the isocyanate-reactive groups of component B are hydroxyl groups and the remainder are aminic or hydrazinic amino groups.

3. The polyisocyanate of claim 1 wherein component A comprises a modified polyisocyanate of the diphenyl methane series which is liquid at room temperature, has an NCO content of about 20 to 32% and comprises a member selected from the group consisting of urethane groups, carbodiimide groups, uretone amine groups and mixtures thereof.

4. The polyisocyanate of claim 1 wherein component B1 comprises a polyether having a molecular weight of about 1,000 to 7,000 and wherein at least about 50% of the isocyanate-reactive groups of said polyether are selected from the group consisting of aromatically bound primary amino groups, aliphatically bound primary amino groups and cycloaliphatically bound primary amino groups.

5. The polyisocyanate of claim 3 wherein component B1 comprises a polyether having a molecular weight of about 1,000 to 7,000 and wherein at least about 50% of the isocyanate-reactive groups of said polyether are selected from the group consisting of aromatically bound primary amino groups, aliphatically bound primary amino groups and cycloaliphatically bound primary amino groups.

6. The polyisocyanate of claim 1 wherein component B2 consists of an aromatic diamine containing a $C_1$–$C_4$ alkyl substituent in at least one ortho position to each amino group.

7. The polyisocyanate of claim 1 wherein the equivalent ratio of isocyanate groups in component A to isocyanate reactive groups in component B is about 4:1 to 50:1.

8. The polyisocyanate of claim 1 which comprises reacting components A and B at a temperature of about 20° to 140° C.

9. A process for the production of a polyisocyanate containing urea and/or biuret groups and having an isocyanate content of about 0.7 to 45% by weight which is prepared by reacting (A) at least one organic polyisocyanate having an NCO content of about 10 to 50% by weight with (B) at least one organic compound containing isocyanate reactive groups comprising (i) a polyether or polyester having a molecular weight of 500 to about 20,000 and containing at least two isocyanate reactive groups comprising a member selected from the group consisting of alcoholic hydroxyl groups attached to primary carbon atoms, alcoholic hydroxyl groups attached to secondary carbon atoms, aromatically bound primary amino groups, aromatically bound secondary amino groups, cycloaliphatically bound primary amino groups, cycloaliphatically bound secondary amino groups, aliphatically bound primary amino groups, aliphatically bound secondary amino groups and mixtures thereof and, optionally, (ii) a low molecular weight organic compound comprising (a) an aromatic diamine or triamine having a molecular weight of 108 to 499 and containing primary and/or secondary amino groups, (b) an aliphatic or cycloaliphatic diamine or triamine having a molecular weight of 60 to 499 and containing primary and/or secondary amino groups, (c) an organic compound having a molecular weight of 61 to 499 and containing at least one alcoholic hydroxyl group attached to a primary or secondary carbon atom and at least one aliphatically, cycloaliphatically or aromatically bound primary or secondary amino group, (d) a compound containing at least two alcoholic hydroxyl groups and optionally at least one ether or ester group, (e) hydrazine or a derivative of hydrazine containing at least two reactive NH groups and (f) mixtures of (a)–(e), and (C) water wherein the equivalent ratio of isocyanate groups in component A to isocyanate reactive groups in components B and C is about 2:1 to 100:1; the equivalent ratio of isocyanate reactive groups in components B and C is about 1:0.1.to 1:10; the equivalent ratio of isocyanate reactive groups in components B1 and C to component B2 is about 1:0 to 1:10; and the equivalent ratio of isocyanate reactive groups in component B1 to component B2 is about 1:0 to 1:5.

10. A process for the production of a polyisocyanate polyaddition product which comprises reacting the polyisocyanate of claim 1 with at least one compound containing isocyanate reactive hydrogens.

11. The process, of claim 10 wherein said polyisocyanate addition product is a molded plastic having a density of about 0.8 to 1.4 g/cm$^2$ and said process is a reaction injection molding process.

* * * * *